Aug. 19, 1941.  J. MIHALYI  2,253,084

FOCAL PLANE SHUTTER

Filed Oct. 17, 1939  4 Sheets-Sheet 1

JOSEPH MIHALYI
INVENTOR

BY
ATTORNEYS

Aug. 19, 1941. J. MIHALYI 2,253,084
FOCAL PLANE SHUTTER
Filed Oct. 17, 1939 — 4 Sheets-Sheet 2

JOSEPH MIHALYI
INVENTOR
BY
ATTORNEYS

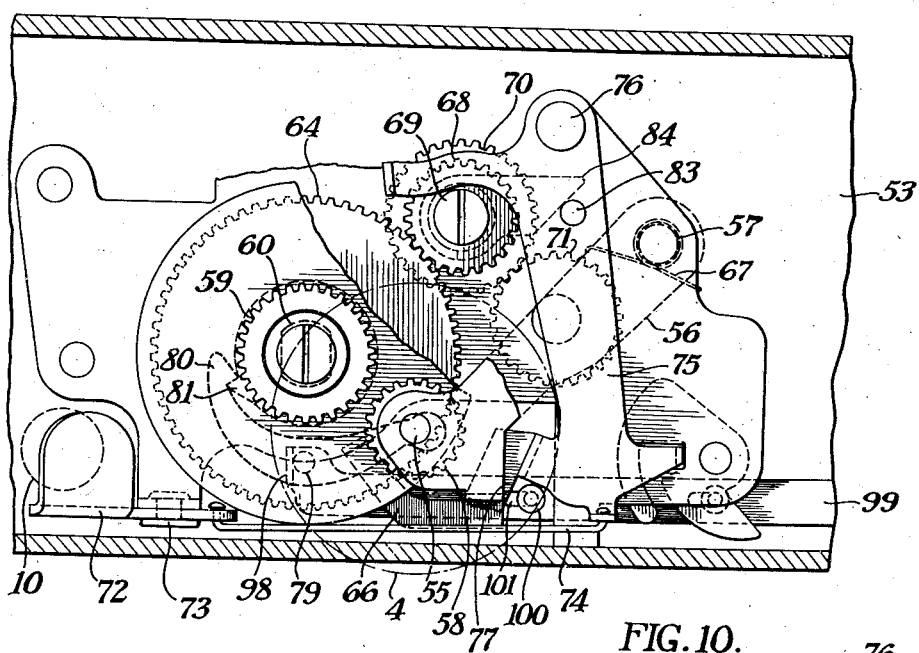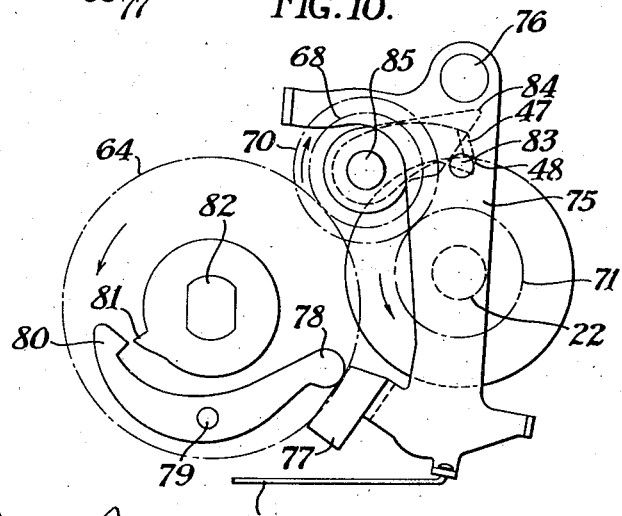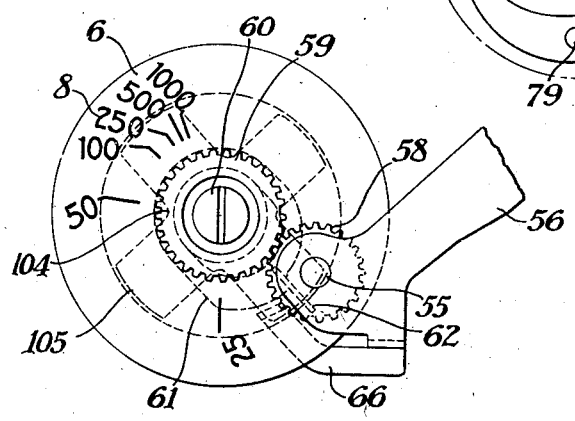

Aug. 19, 1941.  J. MIHALYI  2,253,084

FOCAL PLANE SHUTTER

Filed Oct. 17, 1939   4 Sheets-Sheet 4

JOSEPH MIHALYI
INVENTOR

BY
ATTORNEYS

Patented Aug. 19, 1941

2,253,084

UNITED STATES PATENT OFFICE 2,253,084

FOCAL PLANE SHUTTER

Joseph Mihalyi, Rochester, N. Y., assignor to Eastman Kodak Company, Rochester, N. Y., a Corporation of New Jersey Application October 17, 1939, Serial No. 299,864

11 Claims. (Cl. 95—57)

This invention relates to photography and more particularly to focal plane shutters for photographic cameras. One object of my invention is to provide a focal plane shutter of the type including two curtains, each curtain including an edge which may be used to define the edges of a slot through which an exposure is to be made. Another object of my invention is to provide a shutter of the type described in which the slot width is predetermined and may be set before an exposure is to be made for producing exposures of predetermined duration. Still another object of my invention is to provide a two-curtain shutter in which one curtain is locked after the shutter springs have been set so that the opposite curtain may be moved either backwardly or forwardly to vary the width of the exposure slot. Another object of my invention is to provide a setting member which is directly geared to a manually operated dial member which may be moved on the outside of the camera for adjusting the shutter to a predetermined exposure time and to provide connections between the movable curtain and a second curtain which will tend to maintain a predetermined relationship between the curtains as though moved together for making an exposure and which will permit one curtain to continue to move after the other to close the slot at the end of an exposure and which will cause both shutters to move together without a slot between the curtains in rewinding the curtains to set the springs for the next exposure. Other objects will appear from the following specification, the novel features being particularly pointed out in the claims at the end thereof.

Coming now to the drawings wherein like reference characters denote like parts throughout:

Fig. 9 is a partial plan view of the shutter-control mechanism and release lever.

Fig. 10 is a similar plan, fragmentary only, showing the parts in releasing position.

Fig. 11 is another fragmentary plan showing the shutter speed control disk.

Figure 1:
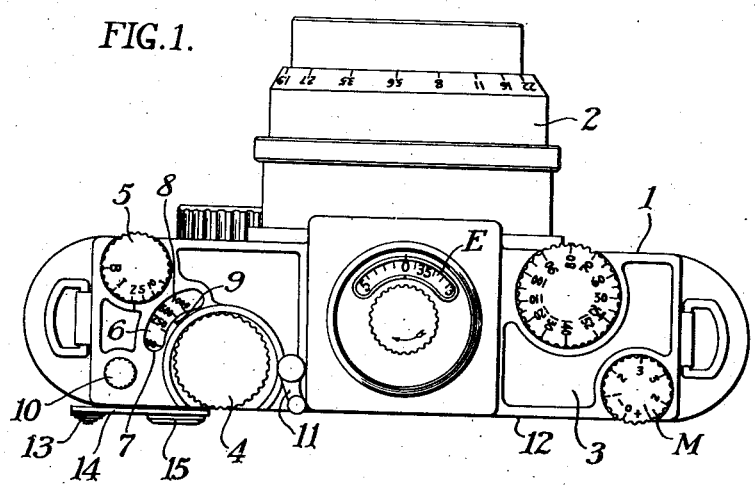
Fig. 1 is a top plan of a camera having a shutter constructed in accordance with this invention.

The camera may consist of a body 1, having a tubular extension 2, carrying the objective, and a top wall 3 which may, in the present embodiment of my invention, support the shutter speed regulating disks 4 and 5. Disk 4 is used to turn a scale plate 6 beneath the window 7 until a speed graduation 8 appears opposite a pointer 9 across the window.

Disk 5 is only used for automatically retarded slow speed exposures and may be turned to adjust the exposure when the dial 4 has been turned to the proper position opposite the slowest exposure on its dial, which is usually 1/25 of a second.

The top wall of the camera 3 also includes the camera trigger 10 and a lever 11 which may be turned to produce a time interval between the operation of the trigger and the operation of the shutter. There may be other dials such as exposure indicating E, finder magnification M which need not be further described as they form no part of my present invention.

On the back wall 12 of the camera, there is a finger piece 13 mounted on the end of an arm 14 carrying a pivot 15 which may be connected through to a dish gear 16 by means of a pawl 16a and ratchet 18, so arranged that by oscillating the lever in one direction, the gear 16 is turned to wind the film and set the shutter, as will be hereinafter more fully described. The dish gear 16 meshes with a gear 17 carried on an inside upper wall of the camera which forms a portion of the shutter winding mechanism.

The film and shutter winding mechanism forms no part of the present invention and is completely shown and described in my Patent No. 2,169,001, Camera shutter setting and film winding mechanism granted August 8, 1939.

The shutter shown in my present application is a modification of the focal plane shutters shown in my Patent 2,140,446, Focal plane shutter, granted December 13, 1938.

The present shutter is of the type employing two curtains coaxially mounted at one end and connected to separate spring rollers at the other end and is of the type in which the width of the slot is set before the curtains are released to make an exposure. It is possible with the construction which will be hereinafter more fully described to provide a slot which may vary in passing across the exposure aperture to compensate for the change in speed of the shutter crossing the exposure aperture by altering the diameter of the spool supporting one curtain relative to the diameter of the spool supporting the opposite curtain and permitting these to turn at the same speed. This may or may not be done according to the characteristics of the shutter required.

Figure 2:
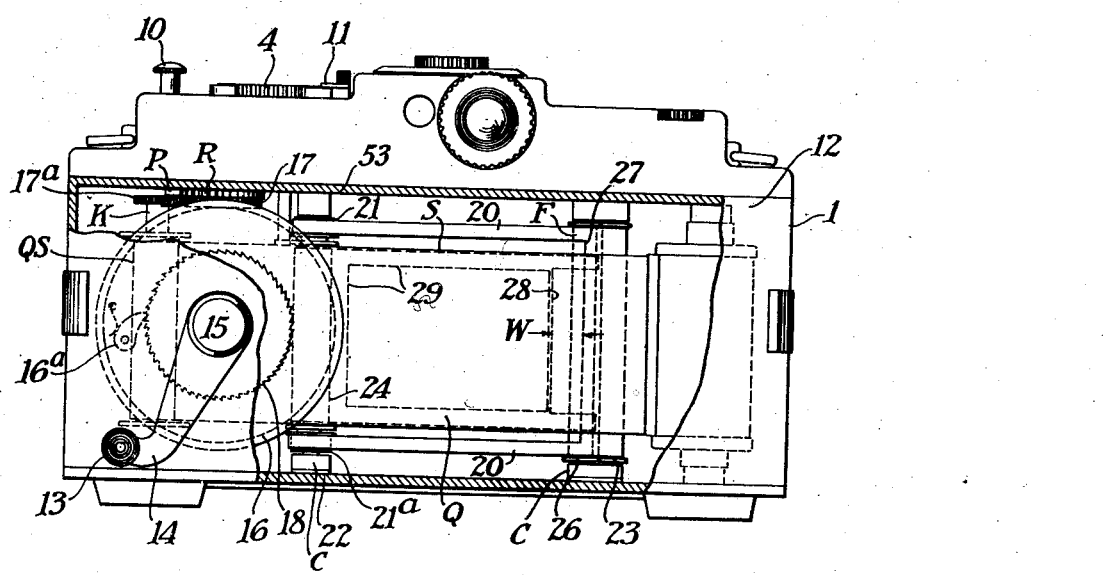
Fig. 2 is a rear view of the camera, parts being broken away to show the curtain shutter and some of the winding mechanism.
Figure 3:
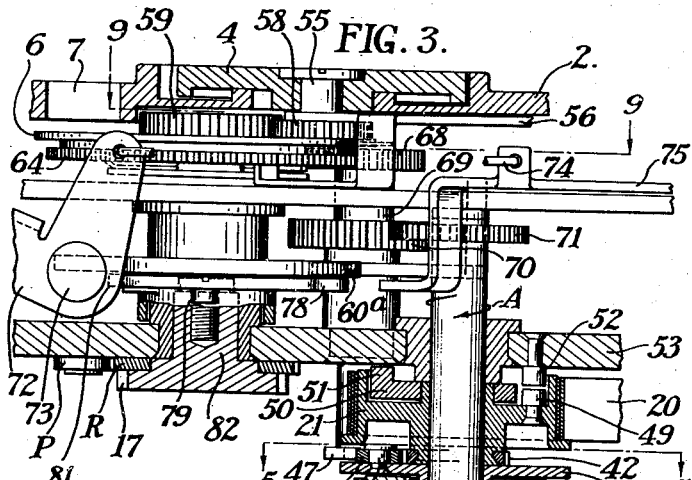
Fig. 3 is a vertical section through the shutter winding rolls and also showing the shutter control mechanism, this and subsequent figures being on an enlarged scale.
Figure 4:
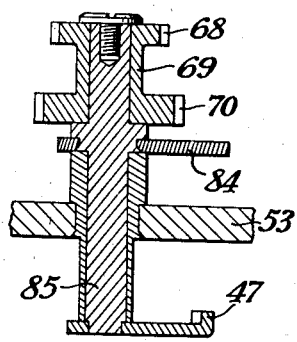
Fig. 4 is a vertical section of a detail on line 4—4 of Fig. 5.
Figure 12:
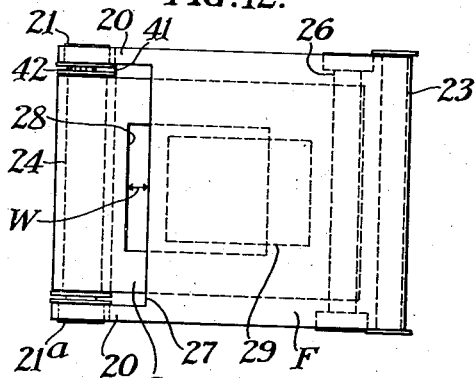
Figs. 12 and 13 are semi-diagrammatic rear elevations of the shutter curtains in the wound and unwound positions respectively.

As indicated in Figs. 12 and 2, the shutter preferably consists of a first curtain F and a second curtain S, the first curtain being attached by means of tapes 20 to a pair of coaxially arranged spools 21 and 21a, best shown in Fig. 3, loosely mounted on a shaft 22. The opposite end of the curtain F is attached to a spring roller 23 always tending to wind the curtain thereon as indicated in Fig. 13.

The second curtain S (Fig. 3) is attached to a roller 24 which is pinned at 25 to the shaft 22. The opposite end of the curtain S is attached to a spring roller 26, in which a spring always tends to wind the curtain S.

In normal operation, a slot of the desired width W (Fig. 12) is formed between the edges 27 of the first curtain and 28 of the second curtain, after which the shutter trigger 10 is depressed, releasing both curtains so that they will move together across an exposure aperture 29 to make an exposure as the curtains are wound on the two spring rollers 23 and 26.

Figure 13:
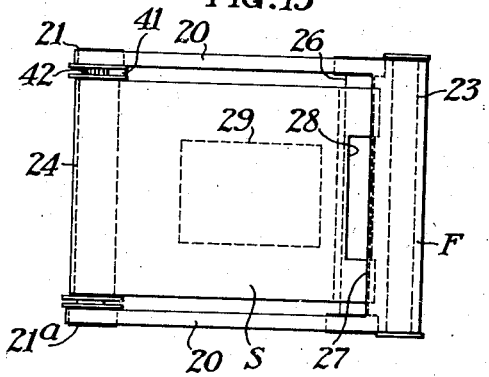
Figure 14:
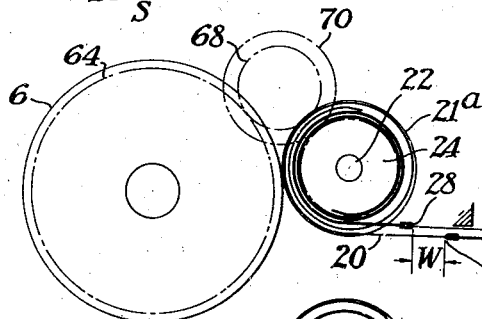
Figs. 14 and 15 are similar diagrams in plan.

When the curtains have been released to make an exposure and are completely wound on their spring rollers as in Fig. 13, in order to make another exposure it is necessary to first set the shutter by winding the two curtains on the coaxially arranged spools 21 and 21a and roller 24. Spools 21, 21a while identical in outside diameter, and while both are mounted to turn freely upon the shaft 22, are nevertheless different in their connection with the roller 24 and the shaft 22.

In the illustrated embodiment of my invention the diameter of the spools and rollers and length of the curtains happen to be such that the total range of movement of the first curtain F requires the spools 21 and 21a to turn 1.818 revolutions while the second curtain S, which must be wound further for setting the widest slot width W for a slow exposure must turn 3.625 revolutions. These figures will vary of course with different sizes and designs of shutters since each individual camera design requires a shutter which will fit into the camera. In the present embodiment there are two sets of limiting stop washers for limiting the movement of the spools and rollers; movement of roller 24 being controlled by the washers and pins adjacent spools 21a and the rotation of spool 21 being controlled by the washers and pins mounted adjacent spool 21.

Thus to provide a limiting stop for the roller 24 pinned at 25 to shaft 22, this shaft carries a sleeve 38 pinned thereto at 39, the end of this sleeve having a flange 39a with an outwardly extending lug 37. This lug may in turning engage lug 36 of washer 36a which lug may engage pin 35 carried by spool 21a, which spool carries a pin 30 to engage lug 31 of the washer 31a, which washer lug 31 may engage the stop pin 32 on the camera shutter support C. Just after roller 24 turns a maximum (in the present instance of 3.625 revolutions), in unwinding, the roller 24 will be brought to a stop against the fixed pin 32. Such limiting stop washers and pins are not broadly new.

Similarly the spool 21 is limited to a maximum (in the present instance) of 1.818 revolutions by pin 49 carried by spool 21 which in turning may engage lug 51 of washer 50 which lug 51 may finally contact and come to a stop against pin 52 which is fixedly mounted on the upper frame plate 53. Thus the possible rotation of the roller 24 and spool 21 is limited ultimately by the stop pins 32 and 52.

The lower spool 21a is not mechanically stopped at all. This is unnecessary as spool 21a is mounted to turn freely on shaft 22 but is connected to sleeve 38 through spring 40 the end of which 40a engages a notch in spool 21a tending to turn this spool in a direction to wind up the lower tape 20 to the extent permitted by the position of the first curtain F. Consequently, when spool 21 stops curtain F through the limiting stop pin 52, spool 21a likewise must come to rest as spring 40 can no longer turn spool 21a relative to shaft 22. Spring 40 is a light one and it merely tends to hold the tape 20 taut and does not materially oppose the torque of the spring in roller 23 which drives the curtain F for an exposure.

Figure 5:
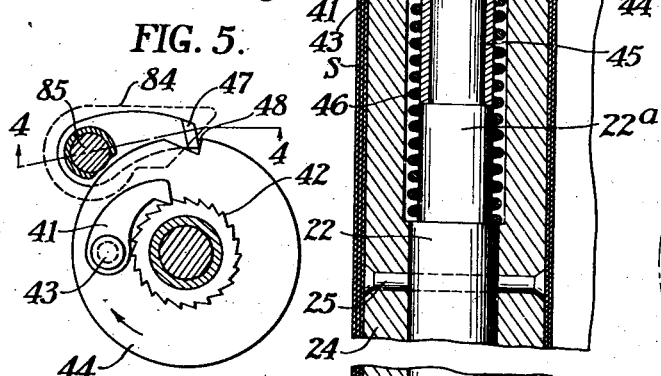
Fig. 5 is a plan-section at the top of the main roller shown in Fig. 3, and taken on line 5—5 in Fig. 3.

The upper spool 21 is in no way connected with the lower spool 21a, but is moved in order to wind up the shutter, from the shaft 22 through the pawl 41 and the ratchet wheel 42 (Fig. 5), the latter being connected directly to the upper spool 21 and being adapted to turn with it. The pawl 41 is pivoted at 43 to an outwardly extending flange 44 having a sleeve 45 which may turn freely on the shaft 22 and having an outside diameter the same as that of the section 22a of the shaft 22. A coil spring 46 is interpositioned between the sleeve 45 and the shaft 22, this spring functioning as a clutch which permits the shaft 22 to be turned in the direction shown by the arrow A in Fig. 3. In winding up the shutter, as the shaft 22 is turned, the pawl 41 will drive the ratchet 42 and through it the spool 21 and with it the tapes 20 (the spool 21a being turned by spring 40) to wind up the curtain F to its completely wound position which is reached when the flange 44 is latched by a latch member 47 dropping into the notch 48. This occurs at the same time that the limiting stop 52 becomes effective through the limiting pin and washer construction described above.

Figure 15:
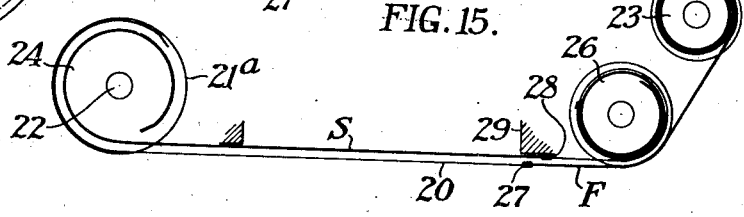
Figure 16:
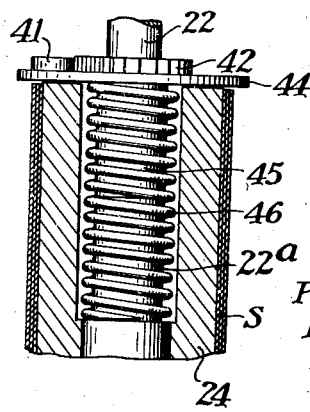
Fig. 16 is a fragmentary vertical section through the winding roll, with parts shown in exterior elevation.
Figure 17:
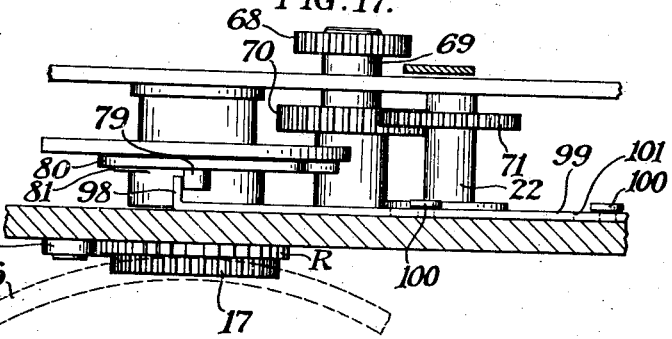
Fig. 17 is a partial elevation somewhat similar to the upper part of Fig. 3.

When the first curtain F has been completely wound and reaches the stop, the slot between the two curtains will have been closed because this slot is closed at the end of each exposure since the first curtain comes to rest before the second curtain and since the pawl 41 may run freely over the ratchet 42 to permit the slot to close regardless of how wide this slot may have been. Thus, during the rewinding movement, the two curtains move together with the edges of the first and second curtains overlapping as indicated in Fig. 15 so that the film may not be fogged in setting the shutter.

Assuming that the next selected exposure is to be 1/100 of a second, the adjusting member 4 may be pressed forwardly, and since this member is pivoted upon a shaft 55 carried by an arm 56, which, in turn, is carried by a stud 57 on the mechanism plate 53, the dial may be moved until the gear 58 (Fig. 9), carried by the shaft 55 which turns with the adjusting disk 4, is brought into mesh with a second gear 59 loosely carried by a shaft 60 which also carries the scale plate 6 fixed to the gear 59. Thus, when the gear 58 is turned, the scale plate 6 is turned and the desired speed numeral may be brought opposite to the pointer 9 of the window 7.

Figure 6:
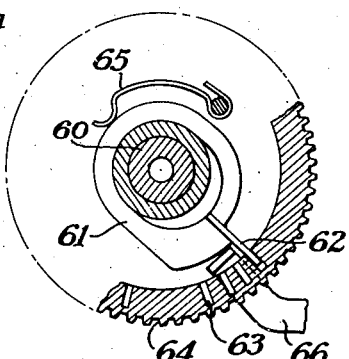
Fig. 6 is a plan-section on line 6—6 of Fig. 8.
Figure 7:
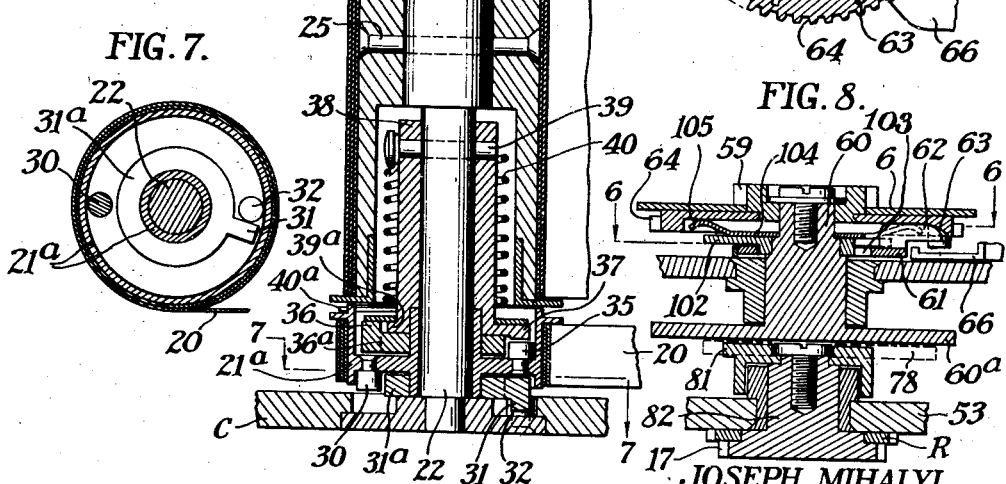
Fig. 7 is a plan-section on line 7—7 of Fig. 3.
Figure 8:
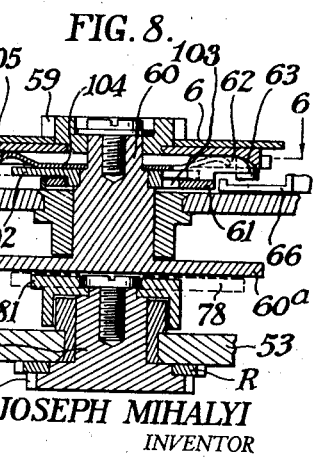
Fig. 8 is a vertical section through the shutter speed control disk and associated parts which appear in Fig. 3.

The forward movement of the member 4 operates the latch mechanism shown in Fig. 6. This latch mechanism consists of a latching plate 61 carrying a lug 62 adapted to enter any one of a series of apertures 63 which are preferably countersunk on their inner edges to latch the scale plate with a gear 64. A spring 65 presses upon the latching plate 61 tending to hold it in the latched position shown. However, when the arm 56 is moved to engage the gears 58 and 59, a branch 66 of this arm which extends down beneath the scale plate 6, as shown in Fig. 8, will engage the latching plate 61 and thrust the latching lug 62 out of an aperture 63.

Thus, before the adjusting dial 4 is turned or before the gears 58 and 59 are meshed, the lug 62 is withdrawn from an aperture 63, enabling the gear 64 to be turned to adjust the width of the slot between the two curtains, as will be more fully hereinafter described. It should also be noticed that as soon as pressure is released from the adjusting plate 4, the arm 56, under the influence of a spring 67, will move the gears 58 and 59 out of mesh, and at the same time will allow the spring 65 to move the latching plate 61 in a direction to engage the latching pin 62 with a selected aperture 63. The apertures 63 are arranged radially in the gear 64, being spaced equidistant to the spaces between the various speed indicating marks on the dial 6. Therefore, when the adjusting member 4 is turned to set the speed of the shutter, as soon as any speed indicating mark comes opposite the pointer 9, a corresponding aperture 63 will lie opposite the latching lug 62 so that by releasing the setting member 4, the lug 62 will engage the proper aperture. If the speed graduation is not exactly opposite the pointer, the countersunk or beveled edge of the aperture will facilitate the entrance of the lug 62 into the proper aperture. It should be noted that by means of the lug 62 and the apertures 63 a positive lock is established between gear 64 and shaft 60, by reason of lug 62 engaging a slot 103 in a washer 102 that is fixed on shaft 60.

When the gears 58 and 59 turn, gear 64 which is freely revoluble on shaft 60, but connected to the gear 59, will be likewise turned and will, through gear 68, sleeve 69, gear 70 and gear 71, turn shaft 22. Since the first curtain F is latched against movement in both directions, by means of the limiting stop 52 and by means of the latch elements 47 and 48, this curtain cannot turn, so that the shaft 22 only turns the roller 24. This turning movement can be accomplished because the spring clutch 46 permits the flange 44 to remain stationary while the slot is being opened up, that is, while the second curtain S is being wound onto roller 24. The width of the slot W between the first and second curtains having now been adjusted, the camera is ready to make an exposure.

To accomplish this, the trigger 10 on the top wall of the camera is depressed, thereby operating a bell-crank lever 72, turning about a pivot 73, so as to pull on the rod 74, causing the release lever 75 to swing about its pivot 76, accomplishing the following functions:

As shown in Fig. 10, lever 75 includes a number of arms. Arm 77 is positioned to contact with an end 78 of a lever pivoted at 79 on a disk-like extension 60a on the lower end of shaft 60. This lever includes a latch element 80 adapted to engage the latch element 81 on the shaft 82, so as to release the second curtain S.

This curtain, however, is not released until after the first curtain F is released, this releasing movement being accomplished by means of a downwardly extending pin 83 which contacts with a cam 84, carried by a shaft 85 which also carries the latch element 47. Thus, as the trigger 10 is depressed, and the lever 75 moves in a clockwise direction with reference to Fig. 10. The first action that takes place is the movement of the arm 84, the shaft 85 and the latch element 47 to release the latch element 48 so that the first curtain F is released. This curtain cannot, however, move because of the pawl 41 and ratchet 42, so that while the latch 47, 48 is released, the curtain F will remain stationary until the latch elements 80 and 81 are disengaged, thus releasing the second curtain S from shaft 82 which remains stationary during an exposure by reason of its connection to ratchet R which may only turn clockwise.

As soon as this curtain is released, both curtains will move together under the impulse of their separate springs and will rapidly cross the exposure aperture 29 to make an exposure. If the diameter of the upper and lower rollers 21 are the same as the roller 24, the curtain aperture will remain at the same width W throughout the entire run of the curtains. However, in the present instance I have shown the upper and lower rollers 21 and 21a to be of slightly greater diameter than the drum 24, and consequently, the width W of the slot will vary, because the upper and lower rollers 21 and 21a move at exactly the same angular speed as the drum 24 in unwinding. I have adjusted these diameters to accurately compensate for the varying speed of the curtains crossing the exposure aperture, due to the variation in torque applied by the spring rollers 23 and 26. It is understood, of course, that the curtains may be made to move at the same lineal speed with the slot of the same width throughout, or the slot may be increased or decreased to compensate for a slowing up or speeding up of the shutters which may occur particularly with cameras of small size where it is difficult to maintain an exactly even torque on the take-up roller.

Because the rotative relation of shaft 22 to the shaft 82 varies in accordance with the width W of the curtain slot after curtain F has been stopped by the limiting pin 52, it is obvious that shaft 82 and the stub shaft 60 which carries the gear 64 cannot be integral or even positively connected. The gear 64, it should be understood, may be revolved on shaft 60 while the latter is stationary.

Fig. 8 clearly shows that shaft 82 to which the latch member 81 is attached, is separate from the shaft 60 bearing the disk 6 and gear 64.

The 1.818 revolutions of spools 21 and 21a previously mentioned represents the entire range of these spools both in winding and unwinding, whereas the range of rotation of roller 24 may be anywhere from 1.818 to 3.625 revolutions, as proportioned in the present instance. Inasmuch as each operation of lever 14 results in one complete revolution of latch member 81, the latch 80 is always restored to the position of Fig. 9 when the shutter is wound. However, member 80 may stop anywhere on its circle of travel when the curtains are released, its final position depending on how far the curtain S travels before being stopped by the pins at the bottom of roller 24 and this in turn depends on how wide the slot W was at the moment of release. In any event, however, the winding of the shutter will always bring the parts into the position shown in Fig. 9 in which the tail 78 of the pawl 80 is in a position to be moved by lug 77 of the release lever 75 to disengage pawl 80 from tooth 81 upon operating of the shutter trigger. If the parts are not in this position, the actuation of the shutter trigger will not release the shutter curtains.

To permit the change of relation above mentioned and still assure that gear 64 will be driven by shaft 60 in winding, a frictional connection, positive enough for driving and to resist the pull of the unwinding springs in rollers 23 and 26 but capable of being slipped when manual member 4 is rotated, is interposed between shafts 60 and gear 64. This device consists of a flat spring 104, fixed to shaft 60, and having a plurality of fingers 105 that bear against the underside of gear 64. One of these fingers is slotted to receive lug 62. A washer 102, which is also fixed to shaft 60 also receives the lug 62. Thus the spring 104, latch piece 81, lug 62 and washer 102 all revolve together. Gear 64 is free on shaft 60. Through this construction the operator may "back off" the curtain S to reduce the width of the exposure slot W, or may wind the curtain further to widen the slot.

If curtain S has been moved to reduce slot W, it is apparent that the gear 64 will not make one full revolution when the shutter is released for an exposure, so, as previously stated, the member 80 may be anywhere in its circular travel and will be picked up from its position by the projection 81 and be restored to normal position (Fig. 9) when the winding stroke is completed.

Assuming that the exposure has been made, the first curtain F reaches its downward limit of movement and the second curtain S continues to move after the first curtain has stopped in order to close up the slit preparatory to rewinding. This can occur because the pawl 41 runs freely over the ratchet 42 until both curtains reach a fully unwound position with respect to their separate spring rollers.

At this time the handle 13 may be oscillated to turn the dish gear 16 which meshes with the gear 17 and winds the film through a mechanism similar to that shown in my Patent No. 2,169,001, and which at the same time winds the curtain shutters.

As indicated in Figs. 2 and 3 the dished gear 16 meshes with gear 17 intergeared with gear 17a which turns the film winding shaft K which winds film Q on the spool QS. It should also be noted that gear 17 carries a ratchet R engaging a pawl P carried by plate 53 so that gear 17 and its carrying shaft 82 can only turn in one direction to wind the film and set the shutter. Consequently, since the latch element 81 is fixedly carried by the shaft, it must be released by latch 80 to permit the shutter to move.

The latch 80 makes exactly one revolution as the shutter unwinds when the curtains are adjusted for maximum opening thus enabling the latch elements 80, 81 to engage as the shutter runs down, so that by again turning shaft 82 by handle 13 the latch 80, 81 through its gearing 63 to 75 turns shaft 21 to wind up or tension the shutter. At any other curtain opening, the latch 80 will make less than one revolution, the portion of a revolution decreasing with increasing shutter speeds.

It should be noted that the pivot pin 79 of latch 80 extends downwardly into the path of a stop flange 98 (Fig. 9) carried by the bar 99, which because of the pins 100 and slots 101 may slide a distance equal to the thickness of the pin 79 and flange 98. Thus, the latching element carried by the disk 80a can only turn 360°.

It should be noticed that all of the winding occurs through the shaft 22 to which the upper spool 21 and lower spool 21 are not attached directly. However, the upper spool 21, through the pawl 41, ratchet 42 and collar 44, is attached to the shaft 22 when this shaft is moved to set the shutter. During this movement, the spring clutch 46 causes the sleeve 45 and the shaft 22 to turn together.

If an operator should desire to first set the shutter for a relatively slow exposure, such as $\frac{1}{25}$ of a second, and later desire to reduce the exposure to say $\frac{1}{500}$ of a second, the shaft 22 may be used to drive the second curtain S rearwardly, although, of course, the spring in the spring take-up roller 26 for the second curtain will immediately wind as much of the curtain as possible upon the take-up roller during the turning movement of the shaft. This movement can occur because the first curtain is always latched against movement in two directions as above explained, and while the latch 47 and 48 hold the collar 44 stationary, the spring clutch 46 permits movement of the roller 24 relative to the upper and lower rollers 21 so that the width W of the slot between the curtains F and S can be adjusted to either increase or decrease the exposure after the shutter has been wound.

The width of the slot may be varied or the shutter "set" only when the shutter is fully wound because only in that condition is the latch 81 in the position where it will be displaced by arm 66 of lever 56 (Fig. 6). Any movement of disk 6 when the shutter is unwound will result in turning shaft 22, thus moving both curtains together for a short distance, when the increasing tension of the springs in rollers 23 and 26 will prevent the operator from completing the winding in this manner. Also, the shutter cannot be released until fully wound, as the tail 78 of latch member 80 will be in position to be moved by arm 77 only when the winding has been completed and the latch 80 engaged with the projection 81.

I claim:

1. In a curtain shutter for cameras including a pair of curtains each having one end attached to a spring roller and having the other ends attached to coaxially arranged spools and a roller respectively, the combination with means for establishing a slot of predetermined width between said curtains comprising gearing directly connected to one of said curtains, and connections between the geared curtain to the other curtain including a sleeve, a pawl and ratchet between the sleeve and the other curtain, and a one way clutch between the sleeve and the geared curtain, a curtain stop, a latch for holding the ungeared curtain against the stop, a speed setting device including a setting member and a clutch between the setting member and the geared curtain for setting the latter while the other curtain is held by its latch.

2. In a curtain shutter including two curtains each defining a part of a variable exposure aperture and each mounted at one end on spring rollers, the combination with a means for controlling the shutter aperture, of three coaxially arranged supports including end spools carrying parts of a first curtain and a center drum carrying parts of a second curtain, means for latching the first curtain in a set position, a manually operable member, gearing connecting the second curtain to the manually operable member for moving said curtain while the first curtain is latched, a collar, a slip clutch between the collar and one curtain, a pawl and ratchet between the collar and the other curtain, whereby movement of the first curtain relative to the latched second curtain may be accomplished through the manually movable means, said first curtain being connected to said gearing solely through the slip clutch.

3. In a curtain shutter including two curtains each defining a part of a variable exposure aperture and each mounted at one end on spring rollers, the combination with a means for controlling the shutter aperture, of three coaxially arranged supports including end spools carrying parts of a first curtain and a center drum carrying parts of a second curtain, means for latching the first curtain attached to the end spools in a fixed position, and means connected solely to the center drum for adjusting the slot between the two curtains.

4. In a curtain shutter including two curtains each defining a part of a variable exposure aperture and each mounted at one end on spring rollers, the combination with a means for controlling the shutter aperture, of three coaxially arranged supports including end spools carrying parts of a first curtain and a center drum carrying parts of a second curtain, means for latching the first curtain attached to the end spools in a fixed position, means connected solely to the center drum for adjusting the slot between the two curtains, and means for connecting the two curtains for rewinding to tension the spring rollers for an exposure.

5. In a curtain shutter including two curtains each defining a part of a variable exposure aperture and each mounted at one end on spring rollers, the combination with a means for controlling the shutter aperture, of three coaxially arranged supports including end spools carrying parts of a first curtain and a center drum carrying parts of a second curtain, means for latching the first curtain attached to the end spools in a fixed position, means connected solely to the center drum for adjusting the slot between the two curtains, a pawl and ratchet between the drum and one of said spools for rewinding the curtains to tension their spring rollers and a one way spring clutch between said one spool and the drum to frictionally connect the drum and the one spool when turned in one direction and to lock the pawl to said one spool.

6. In a curtain shutter for cameras including a pair of curtains each having one end attached to spring rollers and each having their opposite ends attached to rollable supports and each curtain defining a part of a variable width slot, the combination with controlling mechanism for said curtains, of a manually operable member for setting the controlling mechanism comprising a knurled disk, a movable arm on which the disk is pivotally carried and on which it may move to an operative position, means carried by the controlling mechanism adapted to be engaged and moved by the disk when moved on its arm to its operative position, a latch included in the controlling mechanism, a latch releasing element in the path of the disk carrying arm adapted to be actuated thereby to automatically release the latch when said arm is swung to its operative position.

7. In a curtain shutter for cameras including a pair of curtains each having one end attached to spring rollers and each having their opposite ends attached to rollable supports and each curtain defining a part of a variable width slot, the combination with controlling mechanism for said curtains, of a manually operable member for setting the controlling mechanism comprising a knurled disk, a movable arm on which the disk is pivotally carried and on which it may move to an operative position, means carried by the controlling mechanism adapted to be engaged and moved by the disk when moved on its arm to its operative position, a latch included in the controlling mechanism, a latch releasing element in the path of the disk carrying arm adapted to be actuated thereby to automatically release the latch when said arm is swung to its operative position and spring actuated means for operating said latch when said disk swings from its operative position.

8. In a focal plane shutter the combination with a pair of shutter members having edges adapted to be separated to form a slot therebetween, of means for adjusting the width of said slot comprising three coaxially arranged supports, one connected to one shutter member and the other two connected to the second curtain member, a collar mounted between two of the three coaxially arranged supports a pawl and ratchet connection between the collar and one support, a sleeve formed on said collar and extending into another support, an overrunning clutch comprising a coil spring wrapped around said sleeve and a coaxially arranged portion of said other support whereby the two supports may be normally revoluble together but may be moved separately for adjusting the width of said slot.

9. In a focal plane curtain shutter, the combination with two curtains, each defining a part of a variable exposure aperture, of coaxially arranged drum and rollers for supporting parts of the two curtains, a shaft on which said drum and rollers are mounted, means for connecting said drum to said shaft, a sleeve loosely mounted on said shaft between said drum and one of said rollers, a pawl and ratchet connection between the sleeve and said one roller, and a one way coil-spring clutch between the sleeve and drum whereby said drum may be moved relatively to said rollers for adjusting one curtain relatively to the other for varying the duration of an exposure.

10. A setting device for curtain shutters comprising a speed dial, a gear thereon, means for moving the dial including a manually movable disk, a gear carried thereby, a pivoted arm on which the disk and gear are rotatably carried and swingable to and from engagement with the dial, a speed disk for varying the shutter speed, means for positively connecting the setting dial and speed disk, and means for automatically releasing the means for positively connecting the setting dial and speed disk when the manually movable disk and gear are moved to an operative position.

11. A focal plane shutter for cameras including two curtains, spring means for moving the curtains and a coaxial pair of spools and roller on which the curtains may be wound prior to exposure having in combination, means for setting one curtain relative to the other for arranging a slit in between the two curtains of a predetermined width, a central shaft, a sleeve operatively connected to one of said spools and loosely mounted on said shaft, an overrunning one way coil-spring clutch surrounding said sleeve and a coaxially arranged portion of said shaft to connect the latter to said one spool loosely carried by said shaft, pawl and ratchet means for connecting the spools and roller for movement in one direction to make an exposure, said pawl and ratchet permitting one curtain to continue moving after the other has stopped for closing the curtain, and means for manually moving one curtain relatively to the other for establishing the exposure slot whereby the one way clutch between the spool and roller may allow relative movement between the curtains.

JOSEPH MIHALYI.